Jan. 29, 1974     D. G. ROHRBAUGH ET AL     3,788,816

CHEMICAL ANALYSIS ROTARY MODULE

Filed March 2, 1972     4 Sheets-Sheet 1

United States Patent Office 3,788,816
Patented Jan. 29, 1974

3,788,816
CHEMICAL ANALYSIS ROTARY MODULE
Donald G. Rohrbaugh, Santa Ana, and William R. Pearson, Placentia, Calif., assignors to Beckman Instruments, Inc.
Filed Mar. 2, 1972, Ser. No. 231,353
Int. Cl. G01n 1/10, 1/18
U.S. Cl. 23—253 R
15 Claims

ABSTRACT OF THE DISCLOSURE

A chemical sample reactor module, containing a solution of a chemical sample prepared for analysis, is cooperatively paired with a chemical analysis tube module in precise radial alignment in a rotary index table. Multiple paired modules are radially coaligned in the table during the consecutive analysis of a series of chemical samples. Plural sample probes, having individually adjusted vertical and horizontal displacement traverses, are each individually positioned as required on a reciprocating, vertically displaceable central pedestal, providing repetitive programmed transfer and addition of metered reagent volumes to aliquot solution samples. The rotary index table sequentially provides a precise timed period for each aliquot sample solution to uniformly react with precise reagent volumes in a chemical analysis procedure. Utilizing an automated sample probe, a final aliquot analysis procedure sample is measured for a component concentration in a cooperative analytical instrument.

CROSS-REFERENCES TO RELATED APPLICATIONS

This application is related to the following applications, all assigned to the same assignee as the present application:
Ser. No. 177,555 for Tablet Disruptor Device, by Donald G. Rohrbaugh and Everett J. Petersen, Jr., filed Sept. 18, 1971; and the following applications filed herewith,
Ser. No. 231,350 for Chemical Analysis Tube Module by Donald G. Rohrbaugh;
Ser. No. 231,348 for Chemical Sample Reactor Module by Donald G. Rohrbaugh;
Ser. No. 231,268 for Chemical Analysis Sample Dissolver Module by Donald G. Rohrbaugh, Everett J. Petersen, Jr., and C. P. Chase;
Ser. No. 231,351 for Automated Chemical Analyser System by Donald G. Rohrbaugh, William R. Pearson, Everett Petersen, Jr., and C. P. Chase.

BACKGROUND OF THE INVENTION

The chemical analysis rotary module is specifically useful for serially programming an analytical procedure with a previously prepared chemical sample in an aliquot solution. Baruch in U.S. Pat. No. 3,193,358 discloses an apparatus for automatically conducting analytical procedure steps on a row of evenly spaced discrete samples. The apparatus is constructed and programmed to provide controlled adjustable time periods in which chemical reactions and other procedures can take place. By advancing the samples in a row along a predetermined linear path of movement in intermittent stop-and-go fashion, each sample arrives at each station, stays at such a station for a predetermined length of time and moves to the next station. Lever devices provide the up and downward displacement of probes utilized to transfer sample and reagents along the linear path.

Unger in U.S. Pat. No. 3,533,744 discloses an apparatus for automatically analyzing blood or other liquid samples, wherein fractions of each sample are dispensed to separate receptacles in a sample carrier, transported on a linear conveyor to a reagent adding station, and then to a reading station in which the results of the reactions are simultaneously determined and recorded. The apparatus is linearized in terms of all operations.

In Canadian Pat. No. 868,484, Rochte, Martin, Hoffa and Moore disclose an automated chemical analyzer employing an individual capsule for each sample. Automatic means are provided for dropping a capsule, transferring a sample to it, adding reagents, filtering the reacted sample, incubating it, taking a colormetric reading thereof, and finally removing all liquids from the capsule prior to discarding it. The individual sample capsules are conveyed side-by-side past processing stations in stop-and-go fashion by the up-and-down action of rails and the to-and-fro movement of a pair of racks. The racks have teeth engaging the capsule for moving it along when the rails are down, and freeing the capsule when the rails are up. A turntable, indexable to locate a sample container directly below a probe, can be raised to move the sample container up around the probe, thus immersing the probe in the sample contained therein.

In U.S. Pat. No. 3,615,236 Tamm discloses an automatic chemical analysis apparatus including a turntable having a circumferentially arranged large series of reaction vessels into each of which a sample is placed. At rotational positions of the turntable sample treating means are located. At various circumferential positions along the mounting plate periphery, secondary radially extending projection plates carrying the various sample treating devices are removably attached. Moving the entire mounting plate assembly up and down causes various sample treating devices to enter into and clear the various reaction vessels in the turntable. Essentially the turntable accommodates reaction vessels, and sample treating means are adapted to be immersed in the reaction vessel from above and from the exterior perimeter of the turntable.

SUMMARY OF THE INVENTION

The chemical analysis rotary module has a support table disc concentrically rotatively secured by vertically disposed rotary indexing means. The disc has a multiplicity of paired configured cut out apertures, serially disposed at equal arc index steps in the disc. Each set of paired apertures cooperatively secure along closely angularly spaced disc radii pair, a chemical sample reactor module disposed outermost on the first disc radius and a chemical analysis test module. Rotating means provide a stepping rotation of the support table disc in equal arc steps on signal. Elevating means provide accurately secured reciprocating elevational displacement coaxial with the rotary axis on signal. A plurality of liquid volume probe means are scheduled and secured on the elevating means at precise arc steps. They serially repetitively provide quantitative volumes of chemical analysis solutions to scheduled solution containers of the reactor module and test module as the containers are rotated in equal arc steps. Finally a suitable analytical sample solution is provided for a quantitative chemical measurement. The rotary module includes sensing means providing operative sequential signals for the rotary indexing means, the support table disc means, the rotating means, the elevating means, and the plurality of liquid volume probe means.

Other aspects and advantages of this invention are taught in the following description and claims.

BRIEF DESCRIPTION OF THE DRAWINGS

The description of this invention is to be read in conjunction with the following drawings.

DESCRIPTION OF THE PREFERRED EMBODIMENT

Figure 1:
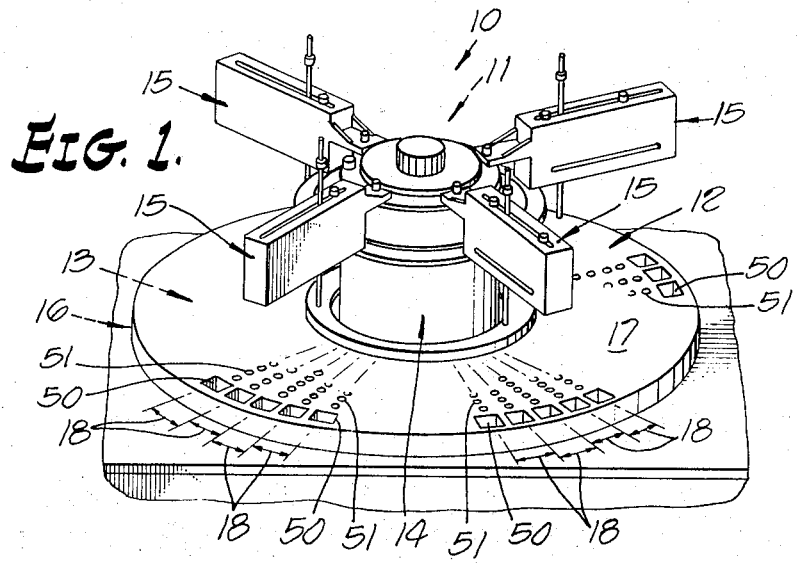
FIG. 1 is a perspective elevational view of the chemical analysis rotary module.

Referring to FIG. 1 in detail, the chemical analysis rotary module 10 is shown with a phantom arrow indicating the rotary indexing means 11 and the support table disc means 12 secured on means 11. The rotating means 13 providing stepping rotation is indicated by the phantom arrow. The elevating means 14 secures the multiple liquid volume probe means 15 thereon and the sensing means 16 is generally indicated by arrow 16. The support table disc 17 is shown with the equal arc index steps 18 between the sets of paired reactor modules 50 and test modules 51.

On signal the support table disc 17 cooperatively carrying typically 40 paired sets of sample reactor module 50 and analysis test modules 51 is rotated, with a specific stationary operating time portion in the stop-and-go movement. As disclosed in the above cross-referenced patent application relating to the sample dissolver module, the chemical sample previously placed in the sample reactor module 50 is cooperatively disintegrated by the dissolver module, providing an individual solution of a sample in an individual sample module 50. The elevating means 14 carrying plural liquid volume sample probe means 15 are disposed at the required intervals of the equal arc index steps of the rotary cycle, providing a timed cycle portion for probe means 15 to interact with modules 50 and 51. As the support table disc 17 rotates in stop-and-go equal arc index steps 18, the elevating means 14 is raised and lowered as required on a cycle time schedule. When the elevating means 14 is lowered, the attached liquid volume probe means 15 are disposed in specific containers of the paired reactor module 50 and test module 51. On signal the elevating means 14 lifts the attached liquid volume probe means 15. While in the container, the probe means 15 can either add a predetermined amount of reagent solution, can withdraw a predetermined volume of a solution in the container, can mix and filter a reacting solution. When the elevating means 14 is disposed at its maximum elevation, a transfer probe tip can be automatically moved from a first pre-set position to a second pre-set position. The elevating means 14 can then be depressed to transfer a previously withdrawn sample to a second container in the paired module combination 50 and 51. Thus by this sequence of events, solutions can be added and withdrawn from the paired modules 50 and 51, sequentially carrying out a chemical analysist procedure. Further details of the procedure will be disclosed later.

The rotary indexing means 11 of the chemical analysis rotary module 10 provides rotation of table disc 17 on signal, on a vertically disposed rotary axis. The support table disc means 12 has a support table disc 17 concentrically rotatively secured normal to the rotary indexing means 11. The disc 17 has a multiplicity of configured cut-out apertures for the paired sample reactor module 50 and analysis test module 51, serially disposed at equal arc index steps 18 in the disc 17. The paired modules 50 and 51 are cooperatively disposed along two closely angularly spaced disc radii. The chemical sample reactor module 50 is disposed outermost on a first disc radius, being oriented to provide a close second disc radius bisecting the filter tube of the reactor module 50. The chemical test analysis module 51 has a planar line of symmetry coincident with the closely angularly spaced second disc radius.

Figure 2:
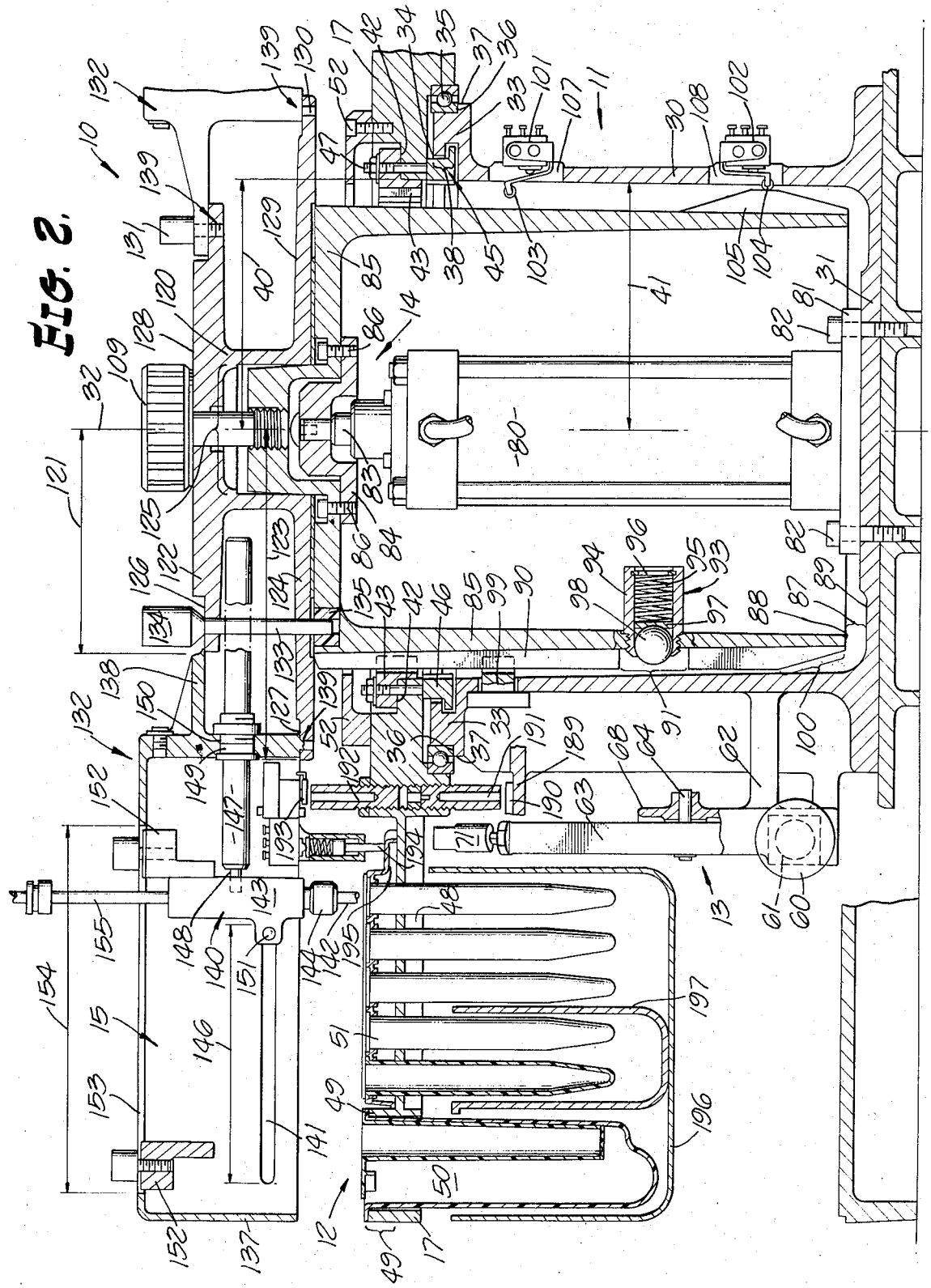
FIG. 2 is an elevational partial cross sectional fragmentary view of approximately a left half of the chemical analysis rotary module, illustrating the module at minimum elevation.
Figure 3:
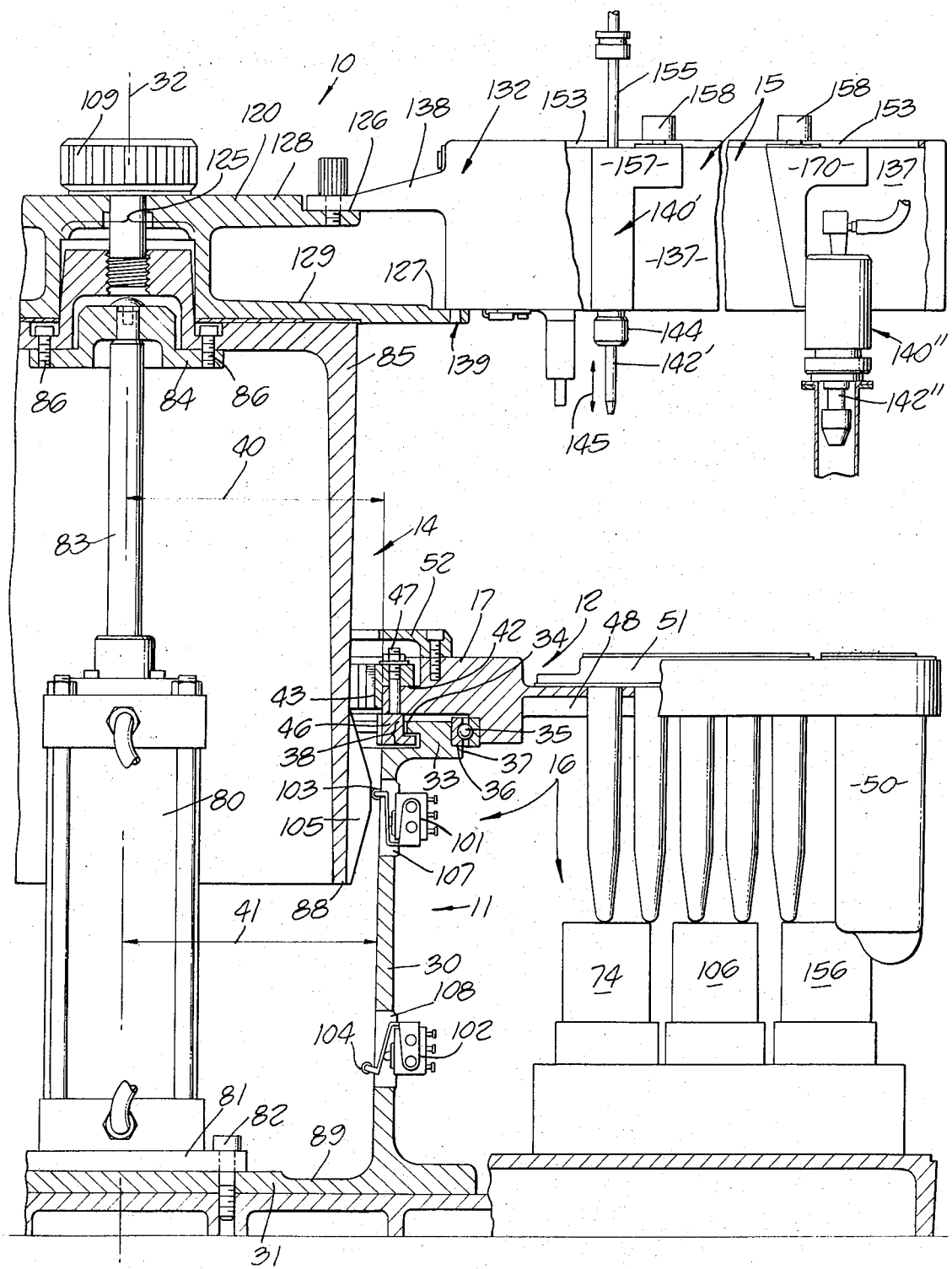
FIG. 3 is the corresponding elevational partial section and fragmentary view of the right half of the chemical analysis rotary module, illustrating the module with the elevating means displaced at a maximum elevation.
Figure 5:
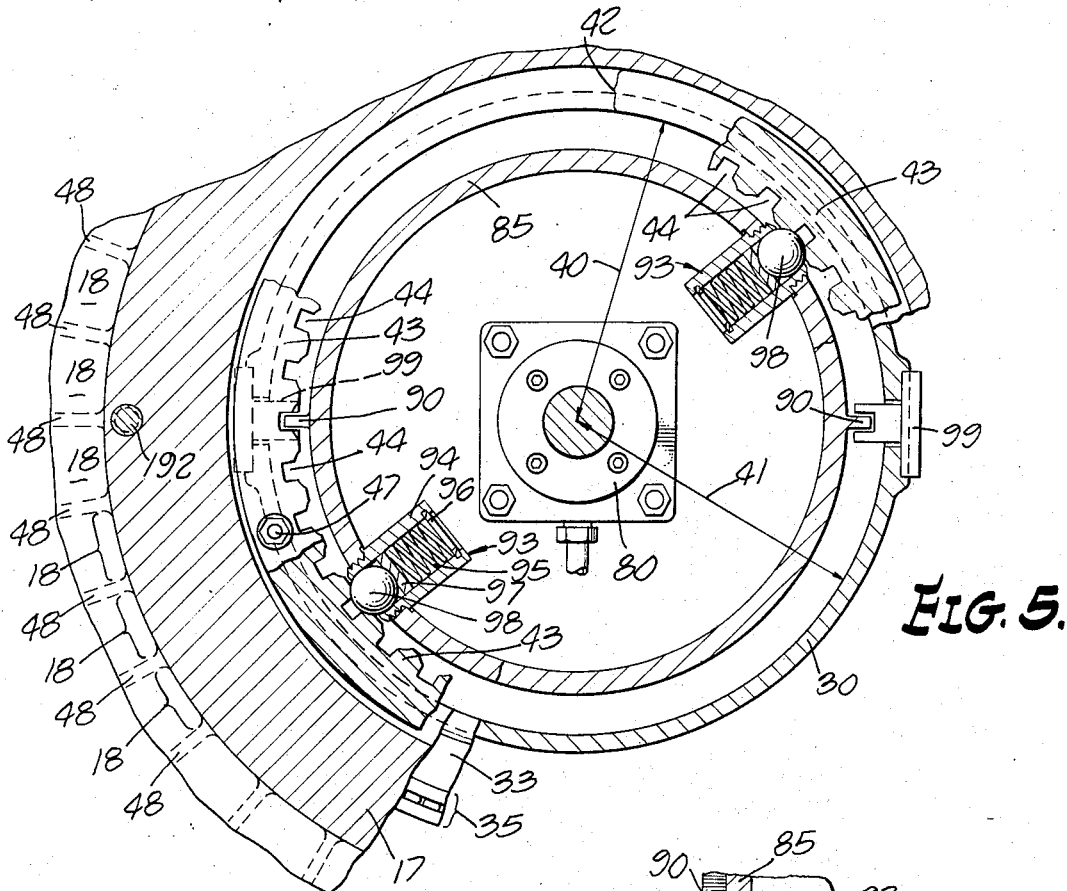
FIG. 5 illustrates in partial cross sectional view the elevating means of the rotary module.

Referring to the rotary indexing means 11 in detail, FIGS. 2, 3, 5 and 6 together in detail disclose a rotary indexing means 11 having a uniform tubular support hub 30 which has a closed hub face 31. The hub 30 has a tubular hub axis of symmetry 32 and an exterior annular flange 33. The support hub 30 has a support hub top aperture 34. An angular contact ball bearing ring 35 is secured in an annular securing groove 36 of the flange 33, groove 36 is in turn disposed adjacent to the annular flange perimeter 37. The support table disc 17 is rotatively disposed on the ball bearing ring 35. An interior groove aperture 38 in the exterior annular flange 33 is cooperatively adapted to secure the table disc 17. The disc 17 has an inner circular aperture radius 40 and the tubular hub 30 has an internal radius 41. A depressed land 42 on the inner aperture radius 40 of the disc 17 provides a securing land for the index ring 43. The ring 43 has a multiplicity of serrated notches 44 best illustrated in FIG. 5. As illustrated in FIGS. 2, 3 and 5 in detail, the index ring 43 is secured to the table disc 17 by rotative locking cam means 45, in which cams 46 secured by fasteners 47 lock the index ring 43 to the table disc 17. The multiple serrated notches 44 of the index ring 43 are carefully angularly indexed to provide a notch serration directly indexed to an equal arc index step 18 as illustrated in FIG. 5. The notch 44 is also aligned to a one-to-one correspondence with table rib 48 disposed on the underside of the table disc 17.

As illustrated in FIG. 2 a raised land 49 is disposed on the exterior perimeter of the disc 17 providing leveling means circularly disposed on the outer perimeter of the disc 17 for the planar top of the multiplicity of paired sample reactor modules 50 and analysis test modules 51.

Figure 4:
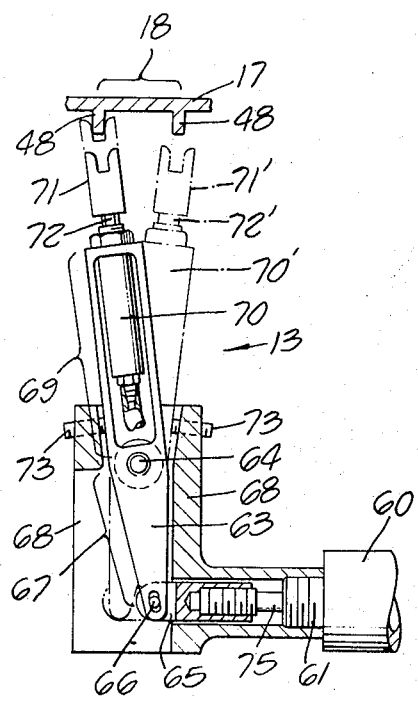
FIG. 4 illustrates in elevational partial sectional view the rotating means providing stepping rotation of the support table disc in equal arc index steps on signal.

The rotating means 13 provides equal arc index steps 18 for the table disc 17. As illustrated in detail in FIGS. 2 and 4, a rotating air cylinder 60 is secured in a first support arm 61, the support arm being secured to the hub 30 exterior tangential to the hub axis of symmetry 32, by the securing arm 62 on the hub casting. A lever arm 63 is secured by the pivot 64 and one terminus of the first lever arm sector 67 is secured by the pivot fastener 66 to the clevis 65 attached to the piston 75 of the rotating air cylinder 60. The first lever arm sector 67 is disposed in a first fork arm 68 and a second lever arm section 69 contains an extending air cylinder 70 disposed therein. A rib engaging fork 71 is secured to the piston 72 of cylinder 70. The rib fork 71 is positioned to engage the multiple ribs 48 of the table disc 17. The pair of opposed adjustment screws 73 fixed in the two tangs of the first fork arm 68 provide angular composite adjustment of the strokes of the cylinders 60 and 70. The rib engaging fork 71 is also shown in phantom as the fork 71', providing engagement of the fork with the rib 48 for rotary displacement of the table 17 in the equal arc index step 18. An air valve means 74 supplies air and air flow restrictions to the cylinders 60 and 70. Conventional air flow restriction means provide a first full supply of air to the cylinder 70 for extension of the piston 72, prior to extending the piston 75 of cylinder 60.

Thus on signal the air valve means 74 supplies air to the rotating air cylinder 60 and the extension arm cylinder 70, the rib engaging fork 71 being first extended by the piston 72 to engage a rib 48 of the table disc 17. With the subsequent extension of the piston 75 of the cylinder 60, the lever 63 is rotated on the pivot 64, displacing a rib 48 a precise equal arc index step 18.

Figure 6:
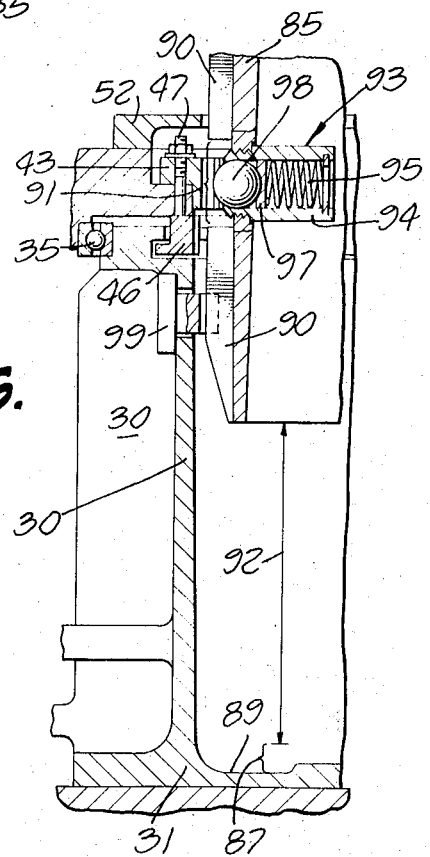
FIG. 6 illustrates in detail the mechanism securing the elevating means preventing rotation at maximum elevation displacement.

Referring now to the elevating means 14 in detail, FIGS. 2, 3, and 5 and 6 cooperatively illustrate the means. An elevating double-acting air cylinder 80 has a cylinder base 81 secured to the closed hub base 31 by the fasteners 82. The cylinder 80 has the piston 83 shown depressed in FIG. 2 and elevated in FIG. 3, the piston 83 being disposed on the hub axis of symmetry 32. A mounting adapter 84 is concentrically secured on the piston 83. A pedestal drum 85 is concentrically secured by plural fasteners 86 to the mounting adapter 84. The drum 85 has an annular gap aperture 87 between the hub base 31 and the drum terminus 88. One of a pair of oppositely disposed drum ribs 90 is shown in FIG. 2 and the pair of ribs 90 are shown in FIG. 5. Each one of a pair of notched apertures 91 are disposed in each one of the ribs 90, as illustrated in FIGS. 2 and 6. FIG. 6 specifiacally indicates the usefulness of the notched aperture 91 in relationship to the pair of ball detent means 93. When the pedestal drum 85 is elevated to the maximum displacement 92 as shown in FIG. 6, each one of the pair of ball detent means 93 are shown engaged with the index ring 43. FIG. 5 further illustrates the precise nature of the engagement of the pair of ball detent means 93 with the index ring 43. The pair of ball detent means 93 function to prevent free wheeling of the table disc 17 when the pedestal drum 85 is elevated to its maximum drum elevation 92. The conventional ball detent means 93 as illustrated in FIG. 5 has a detent cylinder 94 threaded into the pedestal drum 85. An expansion spring 95 is secured at one end of the cylinder 94 by the thrust washer 96 and a non-metallic thrust plate 97 maintains thrust on the ball bearing 98. The ball bearing 98 engages one of the serrated notch apertures 44, preventing free wheeling of the table disc 17. By the application of moderate force, the table disc 17 can be rotated through successive serrated notch apertures 44.

As illustrated in detail in FIGS. 2, 5 and 6, a pair of rib guides 99 are oppositely disposed through apertures in the hub 40, disposed just under the hug flange 33. The pair of oppositely disposed rib guides 99 secure the pair of ribs 90 disposed on the exterior of the pedestral drum 85. The fixed position rib guides 99 prevent the rotation of the pedestal drum 85 by the slotted engagement of the pair of ribs 90. As further illustrated in detail in FIG. 3, the switch means consisting of the pair of micro switches 101 and 102 are secured at the respective top aperture 107 for switch 101 and the bottom aperture 108 for switch 102. The respective micro switches 101 and 102 have the switch actuators 103 and 104 cooperatively operating through the apertures 107 and 108 respectively. The switch actuators 103 and 104 are disposed in elevation on the hub 30 providing a switching action operated by the ramp rib 105 secured on the pedestal drum 85. Thus the switch means disposed on the hub exterior based on the vertical hub line sets the maximum drum elevation when switch 101 is activated, and the minimum drum elevation when the switch 102 is activated. An air valve means 106 supplies air to the elevating air cylinder 80 elevating and depressing the drum 85 on signal, as air is supplied and vented from the cylinder 80.

Figure 7:
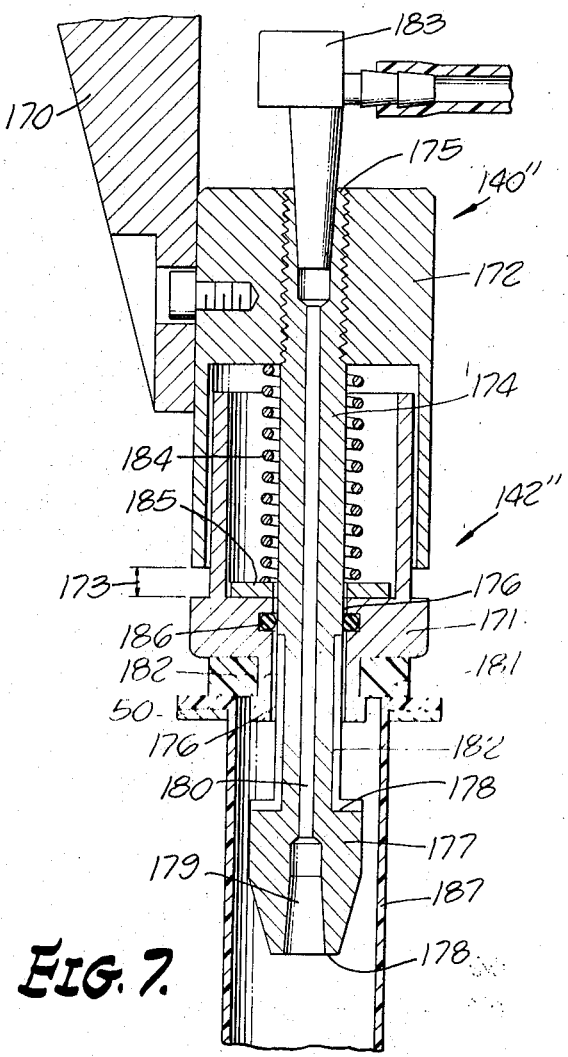
FIG. 7 illustrates in detail a cross sectional view of the sample filter probe means.

Referring to FIGS. 1, 2 and 3 in varying detail, the liquid volume probe means 15 illustrated in FIG. 1 is shown in detail in FIGS. 2 and 3 and includes another probe means further illustrated in FIG. 7.

Referring to FIGS. 2 and 3 in detail, a probe support spool 120 has a small diameter 121 top rim 122 on the spool and a large diameter 123 bottom rim 124. The spool 12 has a central aperture 125 concentrically registering on the mounting adapter 84. The top land 126 and the bottom land 127, are respectively disposed on the top face 128 of top rim 122 and the top face 129 of the bottom rim 124. Multiple pairs of index fastener means 139 comprise the bolt fastener and aperture 131 and the index pin and aperture 130, both angularly coincidentally disposed on the respective top land 126 and the bottom land 127, at angular displacements equivalent to equal arc index steps 18 between the ribs 48 on the table disc 17. The fastener means 139 are equal in number to the number of ribs 48 on the table disc 17. The fastener means 139 provide for securing a multiplicity of horizontally extending sample probe means 132. The probe support spool 120 has a support spool indexing means 133 comprising an index pin 134 secured in an insert 135, which is disposed in the pedestal drum 85. By accurately positioning the indexing means 133, the multiplicity of fastener means 139 on the support spool 120 are brought into precise angular coincidence with the multiplicity of paired modules 50 and 51. A central fastener 109 secures the spool 120.

Referring to FIGS. 2 and 3 in detail each individual sample probe means 132 has a horizontal rectangular housing 137 secured by index fastening means 139. Three modifications of sample probes 140, 140' and 140'' are illustrated in FIGS. 2, 3 and 7, representing modifications of liquid volume probes 15 useful in the rotary module 10. Each sample probe means 140, 140' and 140'' has a probe tip 142, 142' and 142'' vertically extending downward from the rectangular housing 137. Each of these probe tips is adapted to cooperatively function with the pair of modules 50 and 51. A probe, not shown, provides mixing of solutions in modules 51.

A splash pan 196 is disposed under modules 50 and 51, preventing solution spillage on other components. A conventional heater trough 197 provides a heat transfer liquid for the selected containers of tube module 51.

The sample transfer probe 140 has a probe mount 143 and a probe tip 142, which is secured by the adjustable securing means 144 to the mount 143. The mount 143 has a guide pivot 151 fastened thereto, which secures the mount 143 slidably in the housing first horizontal slot 141. The slot 141 has a slot length 146 in which the pivot 151 traverses. A cooperative parallel second slot 153 is disposed in the top of the housing 132 having a second slot traverse length 154 through which the tubular conductive means 155 exists from the probe mount 143. A pair of adjustable mechanical stops 152 provide opposed horizontal traverse limits for the probe tip mount 143, the stops 152 being oppositely secured in the second housing slot 153. An air cylinder 147 has an air piston 148 secured to the probe mount 143. The air cylinder 147 has an air cylinder securing means 149 fixed in a housing aperture 150, providing piston traverse parallel to the pair of slots 141 and 153. An air valve 156 supplies air to the air cylinder 147 on signal, moving the piston 148 out, or conversely in, providing horizontal traverse for the probe mount 143. The securing means 144 provides depth adjustment for the probe tip 142, in order to provide the precise required tip depth in the pair of modules 50 and 51 on application of the transfer probe 140.

The second modification of the sample probe, reagent addition probe 140', is illustrated in detail in FIG. 3 in which a probe tip 142' is disposed in a probe mount 157 which is manually secured in the rectangular housing 137. The housing 137 has the second traverse slot 153 disposed in the top of the housing, in which a fastener 158 manually secures a probe mount 157. The probe tip 142' has a tip depth adjustment illustrated by the arrow 145 and secured by means 144. Tubular conductive means 155 is shown leading from the probe mount 157, providing for fluid conduction into or out of the probe tip 142, as required. The probe tip 142' is traversed manually along the traverse slot 153, and secured in a specific position to dip into one container of the pair of modules 50 and 51 on signal.

A still further probe modification is the sample filter probe 140'' illustrated generally in FIG. 3. The sample probe 140'' is secured in another rectangular housing 137 on a probe mount 170, which in turn is manually adjustably secured by a fastener 158 in a housing slot 153. The probe mount 170 can be adjusted providing for the introduction of the sample probe 140" into any designated container of the pair of modules 50 and 51. As shown in detail in FIG. 7 the sample filter probe 140" has a probe tip 142". The probe tip 142" has a second guide cap 172 permanently secured on the probe mount 170. A first guide cap 171 telescopes inside the second guide cap 172, providing displacement normal to the table disc 17. A filter probe plunger tube 174 is coaxially secured at a first tube terminus 175 to the second guide cap 172, and is coaxially slidably extended through a coaxial aperture 176 in the first guide cap 171. An expansion spring 184 is disposed between the pair of telescoping guide caps 171 and 172, providing expansive thrust. A thrust washer 185 is coaxially disposed around the plunger 174. The coupling cap 177 is disposed at the second plunger tube terminus 178, having a probe tube coupling means 179 disposed therein, which is concentric with the tubular aperture 180 extending through the plunger 174. The tube coupling means can thus provide a simple probe tip depth adjustment for the filter probe 140". A sealing gasket means 181 is dispostd around the guide cap 171, providing sealing means on a filter tube 187 of module 50. A pair of gas leak groove paths 182 are shown disposed in the exterior of the plunger tube 174, which have an O-ring combination seal 186 consisting of a standard O-ring in a groove. The O-ring seal 186 seals the pair of gas leak paths 182 when the displacement 173 is substantially zero preventing gas leakage through the pair of grooves 182. When the expansion spring 184 is partially or fully expanded the gas leak paths 182 are open and provide gas leaks into the filter tube 187 or the like, breaking the vacuum in the tube 187 and allowing the filter probe 140" to be removed from the tube. The groove path means 182 are proportioned to provide a gas seal by interposing the O-ring seal 186 around the gas leak path means. A tubular conductive means 183 is secured to the plunger tube 174 adjacent to the terminus 175, providing conductive means for removing liquid or gas from the filter probe means 140" as is required.

A standard stirring means can be provided for the module 51 by utilizing the rectangular housing 137 in combination with a probe mount 157 or 170 or the like, providing standard rotating or vibrating means for operating the stirrer.

The sensing means 16 illustrated in phantom in FIG. 1 is shown in detail in FIGS. 2 and 3. A first sensor switch 190 is operatively disposed on a casting hub extension 189 adjacent to the table disc 17 underside. The switch 190 provides a precise start position for the analysis module, and is angularly disposed adjacent the operative position of the tablet disruptor device, disclosed and taught in the above cross referenced patent applications. The first sensor switch 190 counts the table disc 17 rotation from the precise start position. The first sensor switch activator 191 is operatively disposed in the table disc 17, cooperatively disposed to activate the first sensor switch 190, the activator 191 providing a precise table disc start position activating a count of one. A second sensor switch activator 192 is operatively disposed on the table disc 17 top side directly over activator 191. A second sensor switch 193 is operatively disposed on each one of the sample probe means 15, as illustrated in FIGS. 1, 2 and 3. It is required that each sample probe means 15 be cooperatively activated by the single activator 192 disposed on the table disc 17.

A land sensor switch 194 is also radially operatively disposed on each one of the sample probe means 15, providing physical detection of the signal land area 195 of the tube module 51 disposed in the table disc 17. Electronic logic provides that the land sensor switch 194 must be activated by the land 195 in a serialized first activation, prior to sequentially operating each one of the sample probe means 15. The land sensor switch 194 activation is required prior to the operation of the sample probe means 15 to prevent the probe means 15 from reacting when no test module 51 is present in the table disc 17. The sensor switches 190 and 193 can be Hall effect switches, with activators 191 and 192 being magnetic plugs. Micro mechanical actuated switches can be used.

In preparatory operation the table disc 17 containing the multiple paired modules 50 and 51 is disposed in the start position, wherein the first sensor switch activator 191 is disposed directly over and adjacent to the first sensor switch 190, thus beginning the count of one on the table rotation. As the rotary module 10 acts the table disc 17 is rotated for one complete cycle. At each of the stop intervals of the stop-and-go cycle, the second sensor switch activator 192 turns on the sensor probe means 15 appropriately disposed above the pair of modules 50 and 51, as the activator 192 operates the second sensor switch 193. Concurrently with the activation of the second sensor switch, there must be sensing by the land sensor switch 194 that a tube module land 195 is contacted, otherwise the sensor probe means 15 cannot operate. As the activator 192 sequentially rotates and reaches the starting probe position again, the activator 192 disenables the cooperatively coacting chemical analysis sample dissolver module. The activator pin 192 continues around the table sequentially, turning off the probe means 15 as they are enabled the second cycle around. As the activator 192 reaches the final readout probe, the rotary module 10 is stopped and put on standby position for further operation.

In application the chemical analysis rotary module 10 is first filled with a full complement of paired modules 50 and 51, each reactor module 50 containing a chemical sample to be analyzed. The module is placed in start-up position by disposing the first sensor switch activator 191 directly over the sensor switch 190 and activating the system reset button. The reset button establishes the start position for the logic, which in turn drives the mechanical elements to their ready or standby positions. In this position the cam timer is in standby, the elevating mans 14 and the liquid volume probe means 15 are disposed up, the transfer probe pistons of the sample probe 140 are extended, and the rotating means 13 is in the retracted position. On activating the start button, the cam timer cycles the table through the following sequence:

(a) The elevating means 14 is activated, displacing the means downward.

(b) The elevating means 14 is displaced to maximum elevation.

(c) The transfer probes 140 are activated, retracting the transfer probe tips to their second present position.

(d) The elevating means 14 is lowered to the minimum displacement.

(e) The elevating means 14 is raised to its maximum displacement.

(f) The rotating means 13 rotates the table disc 17 one equal arc index step 18 counter-clockwise. The transfer sample probe 140 is deactivated, moving the probe tip to its initial present position.

The progress of this sequence continues repetitively and moves the activators 191 and 192 around the full table cycle. As the activator 192 progresses it sequentially activates the individual probe means 15 at their preset positions to perform the following functions in the proper place in the above cycle:

(1) Reagent addition probe (140')

(a) The probe tip dispenses a preset volume of a reagent into a reactor module 50 or a tube module 51 position, previously manually selected when the rotary module 10 is set up.

(2) Transfer probe (140)

(a) The probe tip pipettes a preset volume of sample from the reactor module 50 or tube module 51 position, manually selected in the system setup.

(b) The probe tip is moved to the second preselected container position.

(c) The probe tip dispenses the pipetted volume plus a preset volume of wash reagent.

(3) Mixing probe (not shown)

A mixer probe is activated to stir the preselected container of the tube module 51.

(4) Filter probe (140")

The probe makes contact with and applies a vacuum to the filter tube of the module 50 during the time the elevating means 14 is depressed to minimum elevation.

(5) Readout probe (equivalent to 140')

(a) The probe tube is inserted into the preselected container of the tube module 51 to the preselected depth.

(b) A sample solenoid valve is opened applying a vacuum pulling the sample from the module 51 through the probe tip through the conductive tubing into a sample cell. Typically the sample cell is in a spectrophotometer. The vacuum is applied until the valve is closed by a preset timer.

(c) A spectrophotometer absorbance reading is recorded.

(d) The sample solenoid valve opens the vacuum pulling all of the sample volume from the probe tip, tubing and spectrophotometer cell into a waste container.

By utilizing a transfer probe 140 it is possible to carry out a liquid extraction wherein two immiscible liquids are brought together in a module 50 or 51, and stirred an appropriate period. The liquids are then allowed to separate, and a transfer probe removes one of the immiscible liquids in a probe sample containing the desired chemical product.

Utilizing conventional precision metering pumps, the precise required volumes of a reagent and sample solutions can be supplied from exterior containers, intermixed, and transferred from one container of the paired modules 50 and 51 to another container. The conductive tubings 155 and 183 provide conductive means to and from individual metering pumps. By selecting reagent solutions and scheduling an appropriate specific chemical reaction procedure, the analysis module 10 can be routinely operated to provide a final analysis solution ready for submission to a quantitative measurement instrument. The rotary module 10 can typically provide for forty paired modules 50 and 51. The cycles of the probe means 15 are repeated until all of the multiple paired modules 50 and 51 have been sequentially treated in a selected chemical analysis procedure.

A spectrophotometer is typically used as a measuring instrument to complete these chemical analyses, providing quantitative concentration data. Other types of measuring instruments include a fluorometer, conventional colorometer, a pH meter, or the like.

In view of the public need for repetitively analyzing large numbers of a great variety of complex chemical compostions, pharmaceutical and food products, it becomes necessary to devise an automated means for analyzing these products. This invention, in conjunction with the above cited cross references, provide a distinct inventive advance in the art of preparing a chemical sample for automated chemical analysis.

Obviously many modifications and variations in the improvement in the chemical analysis rotary module can be made in the light of the above illustrations, embodiment and teaching. It is therefore understood that within the scope of the appended claims the invention may be practiced otherwise than has been specifically described.

We claim:

1. A chemical analysis rotary module for serially programming an analytical chemical reaction procedure with an aliquot solution of a chemical sample, comprising in combination:

a rotary indexing means having a vertically disposed rotary axis, providing rotation on signal;

a support table disc means having the support table disc concentrically rotatively secured normal to said rotary axis, said disc having a multiplicity of configured cut-out aperture pairs serially disposed at equal arc index steps in said disc;

rotating means providing stepping rotation of said support table disc in said equal arc index steps on signal;

elevating means providing accurately secured reciprocating elevational displacement coaxial with said rotary axis of said rotary indexing means, providing elevation displacement on signal;

a multiplicity of liquid volume probe means removably scheduled and secured on said elevating means, serially repetitively providing quantitative volumes of chemical analysis solutions to scheduled solution containers of said reactor module and said test module on signal, finally providing a suitable analysis sample for quantitative chemical measurement; and sensing means providing operative sequential signals for said rotary indexing means, said support table disc means, said rotating means, said elevating means, and said multiplicity of liquid volume probe means.

2. A chemical analysis rotary module as set forth in claim 1 wherein said rotary indexing means comprises in combination:

a central uniform tubular support hub having one closed hub base normally disposed to the hub tubular axis of symmetry, and an exterior annular flange disposed around the support hub top aperture;

an angular contact ball bearing ring coaxially disposed in an annular securing groove disposed exteriorly on said exterior annular flange perimeter, providing coaxial rotative support for said support table disc; and an interior annulus groove coaxially disposed in said exterior annular flange, the top of said groove aperture interiorly disposed parallel to said hub tubular axis of symmetry.

3. A chemical analysis rotary module as set forth in claim 2 wherein said support table disc means comprises in combination:

said support table disc concentrically rotatively secured on said ball bearing ring, said table disc having a concentric inner circular aperture radius equivalent to the tubular hub inner radius and having a depressed land radially disposed adjacent said inner circular aperture, each one of said aperture pair cooperatively disposed along two closely angularly spaced disc radii, a first aperture of said pair providing a closely fitting aperture for a chemical sample reactor module disposed outermost on a first disc radius, said first aperture oriented to provide a second disc radius bisecting the filter tube of said reactor module, and a second aperture of said pair providing a closely fitting aperture for a chemical analysis test module whose planar line of symmetry coincides with said aperture pair second disc radius;

an index ring secured in aforesaid depressed land having multiple serrated notch apertures in the inner perimeter of said ring, providing one said notch aperture for each said equal arc index step;

plural rotative locking cam means, arcuately disposed adjacent said inner circular aperture, said cam means secured in said annulus groove of said annular flange by fastener means, said fastener means also coplanarly coaxially securing said index ring on top of said table disc concentrically adjacent to said inner circular aperture, said fastener means secured in said table disc;

a multiplicity of narrow vertical ribs integrally radially disposed on the underside of said table disc, each said rib disposed radially adjacent each multiple serrated notch indentation of said index ring; and a leveling means circularly disposed on the outer perimeter of said table disc providing a top leveling land for the planar top of the multiplicity of pairs of sample reactor modules and analysis test modules.

4. A chemical analysis rotary module as set forth in claim 3 wherein said rotating means providing stepping rotation of said support table disc comprises in combination:

a rotating air cylinder having a cylinder secured in a first support arm, said first support arm secured to said hub exterior tangential to said hub tubular axis of symmetry, said air cylinder extending parallel to said hub base;

a lever arm pivotally secured at one terminus of the first lever arm sector to a clevis secured to the piston of said rotating air cylinder, the centrally pivoted lever arm secured in a first fork arm which is secured normal to said hub base;

an extension air cylinder disposed parallel in the second lever arm sector of aforesaid lever arm, said extension cylinder having a rib engaging fork secured to the piston of said extension cylinder;

a pair of opposed adjustment screws fixed in the two tangs of said first fork arm providing rotational angular composite adjustment of the strokes of said cylinders;

air flow restriction means providing engagement of said rib engaging fork with one said rotating rib, prior to extending said piston of said rotating air cylinder; and, an air valve means supplying air to said rotating and extension cylinders and venting said cylinders on signal.

5. A chemical analysis rotary module as set forth in claim 2 wherein said elevating means comprises in combination:

an elevating double-acting air cylinder whose base is secured to said support hub base, having the elevating piston coaxially disposed with the hub tubular axis of symmetry;

a mounting adapter concentrically secured on said elevating piston;

a pedestal drum concentrically secured by plural fasteners to said mounting adapter, said drum having an annular gap aperture between the drum terminus and the internal hub base, said pedestal drum being coaxially disposed in said hub and concentrically aligned with said index ring, said drum having a pair of indexing ribs integrally oppositely disposed on the drum depth exterior, each one of said ribs having a notch aperture positioned on said rib, said notch aperture engageable with said indexing ring when said drum is elevated to the maximum elevation, said drum having a pair of oppositely disposed ball detent means secured in the drum wall coplanar with said rib notch apertures and rotated therefrom, each one of said ball detent means engageable in a serrated notch aperture of said index ring at maximum drum elevation;

a pair of rib guides secured through the hub wall, each one of said rib guides engaging one of said drum ribs;

a pair of switch means disposed on the hub exterior face on a vertical hub line, each one of said pair of switches secured adjacent a hub terminus, one said switch sensing the maximum drum elevation and one said switch sensing the minimum drum elevation; and, an air valve supplying air to said elevating air cylinder, elevating and depressing said drum on signal.

6. A chemical analysis module as set forth in claim 5 wherein said plurality of liquid volume probe means comprise in combination:

a probe support spool having a small diameter top rim and a large diameter bottom rim and a central aperture precisely concentrically registering on said pedestal drum, said bottom rim adjacent said drum top, said top rim and bottom rim each having a land concentrically disposed on the top face of each of the rim perimeters, and having multiple pairs of index fastener means angularly coincidentally disposed on the top rim and bottom rim lands at angular displacements equivalent to said equal arc steps, providing fastener means for multiple horizontally extending sample probes;

a support spool indexing fastener means securing said spool to said pedestal drum, providing angular alignment of aforesaid multiple fastener means and said multiplicity of configured cut-out apertures in said support table disc;

a plurality of sample probe means, each sample probe means having a horizontal rectangular housing secured by a horizontal arm and an index means to said support spool by one said pair of index fastener means, each one of said housings providing a sample probe adjustably secured in a horizontal slot disposed in said housing, each sample probe having a probe tip vertically extending down from said housing adapted to cooperatively function with aforesaid pair of modules, said probe tip having securing means providing probe tip depth adjustment in said pair of modules.

7. A chemical analysis module as set forth in claim 6 wherein said sample probe means comprises in combination:

a probe tip having a securing tip mount disposing said probe tip normal to said table disc, said tip mount slidably secured in a housing first horizontal slot;

a probe air cylinder secured by a cylinder piston to said tip mount and by the cylinder shell to said probe housing, providing coplanar radial traverse of said table disc on power signal;

a pair of adjustable mechanical stops providing opposed horizontal traverse limits for said probe tip mount, said stops oppositely secured in a second housing horizontal slot parallel to said first slot;

a tubular flexible conductive means secured to the top of said probe tip providing fluid conduction for said probe tip; and, an air valve supplying air to said probe air cylinder on signal, moving said probe tip.

8. A chemical analysis module as set forth in claim 6 wherein said sample probe means comprises in combination:

a probe tip having a securing tip mount disposing said probe tip normal to said table disc, said tip mount slidably secured in a housing second horizontal slot;

a fastener manually locking said securing mount, providing a fixed position on said radial traverse of said table disc; and, a tubular conductive means secured to the top of said probe tip providing fluid conduction for said probe tip.

9. A chemical analysis module as set forth in claim 6 wherein said sample filter probe means comprises in combination:

a securing mount disposing a sample filter normal to said table disc, said mount slidably secured in a housing second horizontal slot;

a fastener manually locking said securing mount, providing a fixed position on said radial traverse of said table disc;

a pair of filter probe tubular guide caps, a first cap slidably telescoping inside a second cap a precise telescoping length, said second cap disposed on said securing mount providing telescoping displacement normal to said table disc;

a filter probe plunger tube coaxially secured at a first tube terminus to said second cap and coaxially slidably extending through a coaxial aperture through said first cap;

an expansion spring coaxially exteriorly disposed around said plunger tube between the insides of said pair of guide caps;

a plunger tube coupling cap coaxially disposed on a second plunger tube terminus having a tubular aperture and tube coupling means coaxial with said plunger tube aperture;

a sealing gasket means coaxially disposed around the exterior of said second cap, providing sealing means for said filter probe;

a gas leak groove path means disposed exteriorly on said plunger tube adjacent said coupling cap, said groove path means proportioned to providing a gas seal by a deformable sealing means providing said pair of guide caps are completely telescoped, and to providing a gas leak by said deformable sealing means providing said pair of guide caps are partially telescoped; and, a tubular conductive means secured to the top of said filter probe providing fluid conduction for said probe.

10. A chemical analysis module as set forth in claim 1 herein said sensing means combination comprises:

a first sensor switch operatively disposed adjacent the table disc underside, providing a precise start position for said analysis module angularly disposed adjacent the operative position of a tablet disruptor device, said first switch counting the table disc rotation from a precise start position as said table disc rotates;

a first sensor switch activator operatively disposed in said table disc, providing a precise table disc start position on activating said first sensor switch on a count of one;

a second sensor switch activator operatively disposed on the table disc top side at said precise start position;

a second sensor switch operatively disposed on each one of said sample probe means, providing activation of each one of aforesaid sample probes by said second switch activator on rotating said second activator directly under each one of said sample probe means;

a land sensor switch radially operatively disposed on each one of said sample probe means, providing detection of the signal land area of a chemical analysis tube module disposed in a table disc, concurrently with the activation of each one of said second sensor switches, said land sensor switch positively requiring a serially first activation prior to sequentially operating each one of said sample probe means; and, a logic means switching off said analysis module, providing said first switch counts two.

11. A chemical analysis module as set forth in claim 10 wherein said sensing means combination comprises:

said first sensor switch and said second sensor switch are Hall effect switches;

said first sensor switch activator and said second sensor switch activator are magnetic plugs; and, said land sensor switch is a mechanical actuator switch.

12. In a chemical analysis rotary module for serially programming an analytical chemical reaction procedure and having a rotary indexing means, a support table disc means, a stepping rotation means, and an elevational means, the combination comprising:

a central uniform tubular support hub having one closed hub base normally disposed to the hub tubular axis of symmetry, and an exterior annular flange disposed around the support hub top aperture;

an angular contact ball bearing ring coaxially disposed in an annular securing groove disposed exteriorly on said exterior annular flange perimeter, providing coaxial rotative support for said support table disc; and, an interior annulus groove coaxially disposed in said exterior annular flange, the top of said groove aperture interiorly disposed normal to said hub tubular axis of symmetry;

a support table disc concentrically rotatively secured on said ball bearing ring, said table disc having a concentric inner circular aperture radius equivalent to the tubular hub inner radius and having a depressed land radially disposed adjacent said inner circular aperture;

an index ring secured in said depressed land having multiple serrated notch apertures in the inner perimeter of said ring, providing one said notch aperture for each said equal arc index step;

plural rotative locking cam means, arcuately disposed adjacent said inner circular aperture, said cam means secured in said annulus groove to said annular flange by fastener means, said fastener means also coplanarly coaxially securing said index ring on top of said table disc concentrically adjacent to said inner circular aperture, said fastener means secured in said table disc;

a multiplicity of narrow vertical ribs integrally radially disposed on the underside of said table disc, each said rib disposed radially adjacent each multiple serrated notch indentation of said index ring;

a rotating air cylinder having a cylinder secured in a first support arm, said first support arm secured to said hub exterior tangential to said hub tubular axis of symmetry, said air cylinder extending parallel to said hub base;

a lever arm pivotally secured at one terminus of the first lever arm sector to a clevis secured to the piston of said rotating air cylinder, the centrally pivoted lever arm secured in a first fork arm which is secured normal to said hub base;

an extending air cylinder disposed parallel in the second lever arm sector of aforesaid lever arm, said extending cylinder having a rib engaging fork secured to the piston of said extension cylinder;

a pair of opposed adjustment screws fixed in the two tangs of said first fork arm providing rotational angular composite adjustment of the strokes of said cylinders;

air flow restrictions means providing engagement of said rib engaging fork with one said rotating rib, prior to extending said piston of said rotating air cylinder;

an air valve means supplying air to said rotating and extending cylinders and venting said cylinders on signal;

an elevating double-acting air cylinder whose base is secured to said support hub base, having the elevating piston coaxially disposed with the hub tubular axis of symmetry;

a mounting adapter concentrically secured on said elevating piston;

a pedestal drum concentrically secured by plural fasteners to said mounting adapter, said drum having an annular gap aperture between the drum terminus and the internal hub base, said pedestal drum being coaxially disposed in said hub and concentrically aligned with said index ring, said drum having a pair of indexing ribs integrally oppositely disposed on the drum depth exterior, each one of said ribs having a notch aperture positioned on said rib, said notch aperture engageable with said indexing ring when said drum is elevated to the maximum drum elevation, said drum having a pair of oppositely disposed ball detent means secured in the drum wall coplanar with said rib notch apertures and rotated therefrom, each one of said ball detent means engagable in a serrated notch aperture of said index ring at maximum drum elevation;

a pair of rib guides secured in the drum wall, each one of said rib guide engaging one of said drum rib;

a pair of switch means disposed on the hub exterior face on a vertical hub line, each one of said pair of switches secured adjacent a hub terminus, one said switch means sensing the maximum drum elevation and one said switch sensing the minimum drum elevation; and, another air valve supplying air to said elevating air cylinder, elevating and depressing said drum on signal.

13. In a chemical analysis rotary module for serially programming an analytical chemical reaction procedure with an aliquot solution of a chemical sample, having a rotary indexing means having a vertically disposed rotary axis, a support table disc means having the support table disc concentrically rotatively secured normal to said rotary axis, said disc having a multiplicity of configured cut-out aperture pairs serially disposed at equal arc index steps in said disc, rotating means providing stepping rotation of said support table disc in said equal arc index steps on signal, and elevating means providing accurately secured reciprocating elevational displacement on signal coaxial with said rotary axis of said rotary indexing means, the liquid volume probe means combination comprising:

a probe support spool having a small diameter top rim and a large diameter bottom rim and a central aperture precisely concentrically registering on said elevation means, said bottom rim adjacent said elevator means top, said top rim and bottom rim each having a land concentrically disposed on the top face of each of the rim perimeters, and having multiple pairs of index fastener means angularly coincidentally disposed on the top rim and bottom rim lands at angular displacements equivalent to said equal arc steps, providing fastener means for multiple horizontally extending sample probes;

a support spool indexing fastener means securing said spool to said pedestal drum, providing angular alignment of aforesaid multiple fastener means and said multiplicity of configured cut-out apertures in said support table disc;

a plurality of sample probe means, each sample probe means having a horizontal rectangular housing secured by a horizontal arm and an index means to said support spool by one said pair of index fastener means, each one of said housings providing a sample probe adjustably secured in a horizontal slot disposed in said housing, each sample probe having a probe tip vertically extending down from said housing adapted to cooperatively functioning with aforesaid pair of modules, said probe tip having securing means providing probe tip depth adjustment in said pair of modules.

14. A chemical analysis module as set forth in claim 13 wherein said sample probe means comprises in combination:

a probe tip having a securing tip mount disposing said probe tip normal to said table disc, said tip mount slidably secured in a housing first horizontal slot;

a probe air cylinder secured by a cylinder piston to said tip mount and by the cylinder shell to said probe housing, providing coplanar radial traverse of said table disc on power signal;

a pair of adjustable mechanical stops providing opposed horizontal traverse limits for said probe tip mount, said stops oppositely secured in a second housing horizontal slot parallel to said first slot;

a tubular flexible conductive means secured to the top of said probe tip providing fluid conduction for said probe tip; and, an air valve supplying air to said probe air cylinder on signal, moving said probe tip.

15. A chemical analysis module as set forth in claim 13 wherein said sample probe means comprises in combination:

a probe tip having a securing tip mount disposing said probe tip normal to said table disc, said tip mount slidably secured in a housing second horizontal slot;

a fastener manually locking said securing mount, providing a fixed position on said radial traverse of said table disc; and, a tubular conductive means secured to the top of said probe tip providing fluid conduction for said probe tip.

References Cited
UNITED STATES PATENTS

| | | | |
|---|---|---|---|
| 3,081,158 | 3/1963 | Winter | 23—259 |
| 3,192,968 | 7/1965 | Baruch et al. | 23—259 X |
| 3,570,555 | 3/1971 | Gilson | 23—259 X |

MORRIS O. WOLK, Primary Examiner

R. E. SERWIN, Assistant Examiner

U.S. Cl. X.R.

23—259; 73—425.4 R; 141—130